United States Patent
Becker (10) Patent No.: US 6,551,104 B2
(45) Date of Patent: Apr. 22, 2003

(54) REWARD BASED GAME AND TEACHING METHOD AND APPARATUS EMPLOYING TELEVISION CHANNEL SELECTION DEVICE

(76) Inventor: Russell Craig Becker, P.O. Box 50911, Eugene, OR (US) 97405

( * ) Notice: Subject to any disclaimer, the term of this patent is extended or adjusted under 35 U.S.C. 154(b) by 212 days.

(21) Appl. No.: 09/800,429

(22) Filed: Mar. 5, 2001

(65) Prior Publication Data
US 2002/0012894 A1 Jan. 31, 2002

Related U.S. Application Data
(60) Provisional application No. 60/186,912, filed on Mar. 3, 2000.

(51) Int. Cl.$^7$ ............................................ G09B 5/00
(52) U.S. Cl. ................................... 434/201; 434/365
(58) Field of Search ............................. 434/322, 323, 434/350, 362, 188, 191, 201

(56) References Cited

U.S. PATENT DOCUMENTS

| | | | |
|---|---|---|---|
| 4,117,607 A | * | 10/1978 | Gill ........................... 434/201 |
| 4,259,668 A | * | 3/1981 | Nishimura et al. ......... 345/169 |
| 4,389,194 A | | 6/1983 | Toll et al. |
| 4,425,096 A | | 1/1984 | Schwake |
| RE32,282 E | | 11/1986 | Baer |
| 5,034,807 A | | 7/1991 | Von Kohorn |
| 5,051,837 A | | 9/1991 | McJunkin |
| 5,219,291 A | * | 6/1993 | Fong et al. .................. 434/323 |
| H001452 H | * | 6/1995 | Kennedy .................... 434/322 |
| 5,520,541 A | | 5/1996 | Shedeur |
| 5,716,273 A | | 2/1998 | Yuen |
| 5,733,131 A | | 3/1998 | Park |
| 5,842,869 A | | 12/1998 | McGregor et al. |
| 5,842,871 A | * | 12/1998 | Cutler et al. ................. 434/335 |
| 5,957,695 A | * | 9/1999 | Redford et al. ......... 434/307 R |

* cited by examiner

Primary Examiner—Joe H. Cheng
Assistant Examiner—Kathleen Christman (57) ABSTRACT

The present invention includes an apparatus and a method for teaching relationships between numbers and how to perform certain types of mathematical operations. The system includes a television channel selection device, such as a remote control device with a visual display. The user selects a channel to view, and is presented with a mathematical problem involving the channel number. When the problem is correctly solved, the television switches to the selected channel. If an incorrect solution is entered, the user is given further opportunities to solve the problem before being prompted to a solution. The degree of difficulty of the problems can be adaptively adjusted, depending upon the accuracy of the user's answers.

22 Claims, 6 Drawing Sheets

REWARD BASED GAME AND TEACHING METHOD AND APPARATUS EMPLOYING TELEVISION CHANNEL SELECTION DEVICE

This application claims priority from U.S. Provisional No. 60/186,912, filing date Mar. 3, 2000.

TECHNICAL FIELD OF THE INVENTION

The present invention relates to the field of educational devices that use rewards to motivate learning.

BACKGROUND OF THE INVENTION

Reward systems have long been employed to motivate learning. The everyday approvals and disapprovals of teachers, for example, provide both incentives for good performance and disincentives for poor performance, that is, both positive and negative reinforcement. Whether in the form of grades, passed or failed classes, or simply success or failure to learn, these rewards and punishments, incentives and disincentives, positive and negative reinforcements are the essence of every system of instruction. Many different types of reward systems have been used. Some teachers and teaching systems, for example, award points for accomplishments, with the points being redeemable for prizes.

Away from school, however, the approvals and disapprovals of teachers to be faced another day are frequently insufficient to motivate students to spend enough time on their studies. The more tangible rewards offered by teachers or parents are also often ineffective. Homework is frequently neglected in favor of recreation, including video games and television. The appeal of electronic devices offering instant gratification often overwhelms the perceived reward potential of a parent's or a teacher's future approval, better grades, or mastery of a subject.

Electronic educational devices, both stand-alone devices and teaching programs operating on a general purpose computer, have proliferated since the advent of low-cost integrated circuits. While such devices have the potential to educate, students often lack the motivation to use them. Some electronic systems have attempted to motivate leaning by providing rewards For example, U.S. Pat. No. 5,035,625 to Munson discloses a teaching method and system in which educational information is presented during a computer game. The teaching program interrupts the game and displays a question selected from a tutorial module. The user's responses to the questions are tabulated, and, upon correct responses to a predetermined number of questions, the user is rewarded by the scoring algorithm for the game being modified to permit the user to achieve higher scores.

U.S. Pat. No. 5,743,746 to Ho discloses a computer-aided educational system providing a reward determined by a milestone setter, a performance analyzer, a reward determinator, and a reward generator. Rewards, in the form of prizes selected by a parent or teacher, are generated as students pass the milestones set by a parent or teacher.

U.S. Pat. No. 5,009,603 to Fong discloses a system that employs a standard television receiver in an educational application intended to appeal to children. A microprocessor cooperates with a digital memory, a video generator, a sound generator, and a voice synthesizer to generate questions and related images on the television receiver. A child's response is compared to the correct response stored in the digital memory and, if the response is correct, the pictorial representation associated with a particular question becomes animated to provide an indication of the correctness of the response and to motivate the child.

It is well known that learning is strongly motivated when it is to be rewarded by achievement of a highly valued goal. The need to communicate in a foreign land, for example, often leads to rapid acquisition of its language. A functionally illiterate adolescent may be motivated to learn to read by the powerful inducement of a driver's license, with its written examination. It is also not unusual for young children, with the powerful attraction of television and videotapes, to master complex programming of video cassette recorders, programming sequences that may have baffled their parents. None of the aforementioned systems, however, employ this type of highly motivating reward, intending instead that learning be motivated by "rewards" provided within the system itself or by the attractive force of available prizes.

It is also well known that learning is strongly reinforced when the reward, as in the real-life examples just cited, is a direct and natural outcome of the application of the relevant knowledge. Again, none of the aforementioned systems are so structured; instead, they employ rewards only arbitrarily related to the educational exercises.

Electronic teaching systems are needed which make use of students' own motivations to achieve real-life goals, and which provide educational exercises that lead directly and naturally to those goals.

SUMMARY OF THE INVENTION

It is an objective of the invention to provide teaching methods and apparatus that use rewards to motivate learning.

It is another object of the invention to provide such methods and apparatus in which the rewards are real-life goals of the learner.

It is yet another object of the invention to provide such methods and apparatus in which the rewards are functionally related to the educational exercise.

It is still another object of the invention to provide such methods and apparatus using a television channel selection device.

It is a further object of the invention to provide such methods and apparatus for teaching mathematical relationships and skills and facts associated with numbers.

It is a still further object to provide such methods and apparatus that use television as a reward to motivate learning.

In accordance with the invention, apparatus and methods are provided for teaching through the use of student-chosen rewards and educational exercises related to the chosen rewards.

Watching television is a popular activity. Children and adults are often highly motivated to see a particular show or to watch a particular channel. When a child forms an attachment to a particular television show or character from a show, for example, the child is often strongly motivated not to miss an episode. The present invention employs the desire to watch television as an incentive for learning and practicing academic skills.

The apparatus includes a channel selection device including input and output devices for communicating with a user. For example, the channel selection device may include keys or voice recognition circuits for the user to input information, and the output device may include a liquid crystal display, an array of light emitting diodes, or other visual or audio user-interface devices. The input and output devices may be located on a remote control device, on a set-top box, on the television itself, or elsewhere. The channel selection device performs all the functions of a standard television channel selection device, but further includes a unique instructional feature with regard to channel selection.

After the user enters a desired channel, the output device presents the user with a problem or question. This may take the form of a mathematical equation that involves the number of the selected channel, or a question from another subject area related to the number. If the user correctly answers the question, the output device so indicates, and the channel selection device causes the television set to switch to the selected channel. If the user supplies an incorrect answer, the television set will not switch to the desired channel. Thus, the user is motivated to answer the question correctly in order to be able to view his or her selected channel. The user has therefore selected his own reward, increasing motivation, and the reward, that is, the channel number, is integrated into the educational exercise, thereby providing strong reinforcement.

Many variations and enhancements can be made to the system to further facilitate learning. For example, if the user supplies an incorrect answer, the output device so indicates and may provide the user with another opportunity to answer the question. After a predetermined number of attempts, the correct answer may be indicated for the user to enter. This cycle continues until the user supplies the correct answer, with the output device preferably providing appropriate encouraging messages. The degree of difficulty of the presented questions can be automatically adapted to the user by increasing the difficulty as questions are answered correctly or decreasing the difficulty if too many questions are missed. When a question is susceptible to more than one connect answer, the user could be required to use different answers at different times.

Other objects and many of the attendant features of this invention will be more readily appreciated as the invention becomes better understood by reference to the following detailed descriptions and considered in connection with the accompanying drawings.

DETAILED DESCRIPTIONS OF PREFERRED EMBODIMENTS

Figure 1:
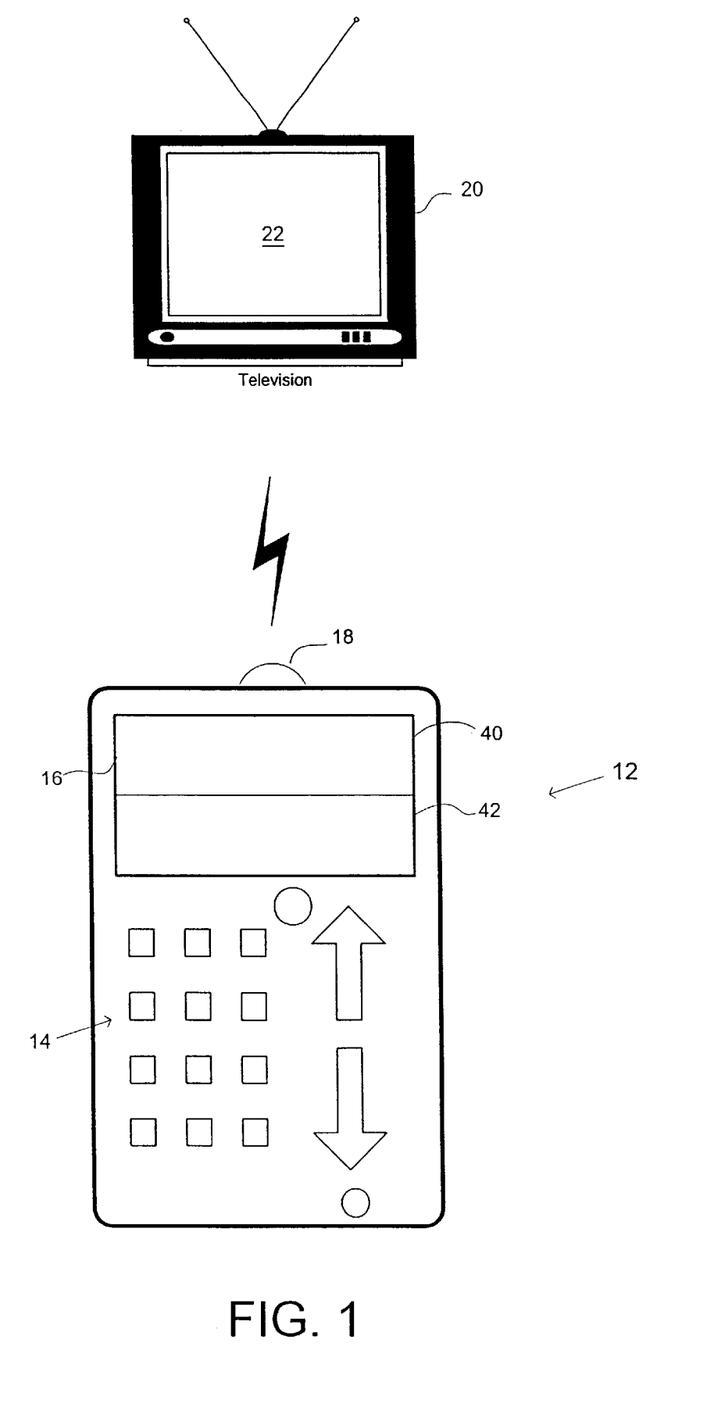
FIG. 1 shows a remote control device that incorporates the present invention.

FIG. 1 shows that a preferred embodiment of the present invention includes a channel selection device, such as a remote control device 12, that includes an input device, such as a key pad 14, for entering information and an output device, such as display 16, for displaying information to the user. Remote control device 12 also includes an infrared light-emitting diode (LED) 18 for communicating with a receiver connected to a television 20 having a screen 22. Other communications systems, such as a radio frequency system, can be used to communicate between remote control device 12 and the television.

Figure 2:
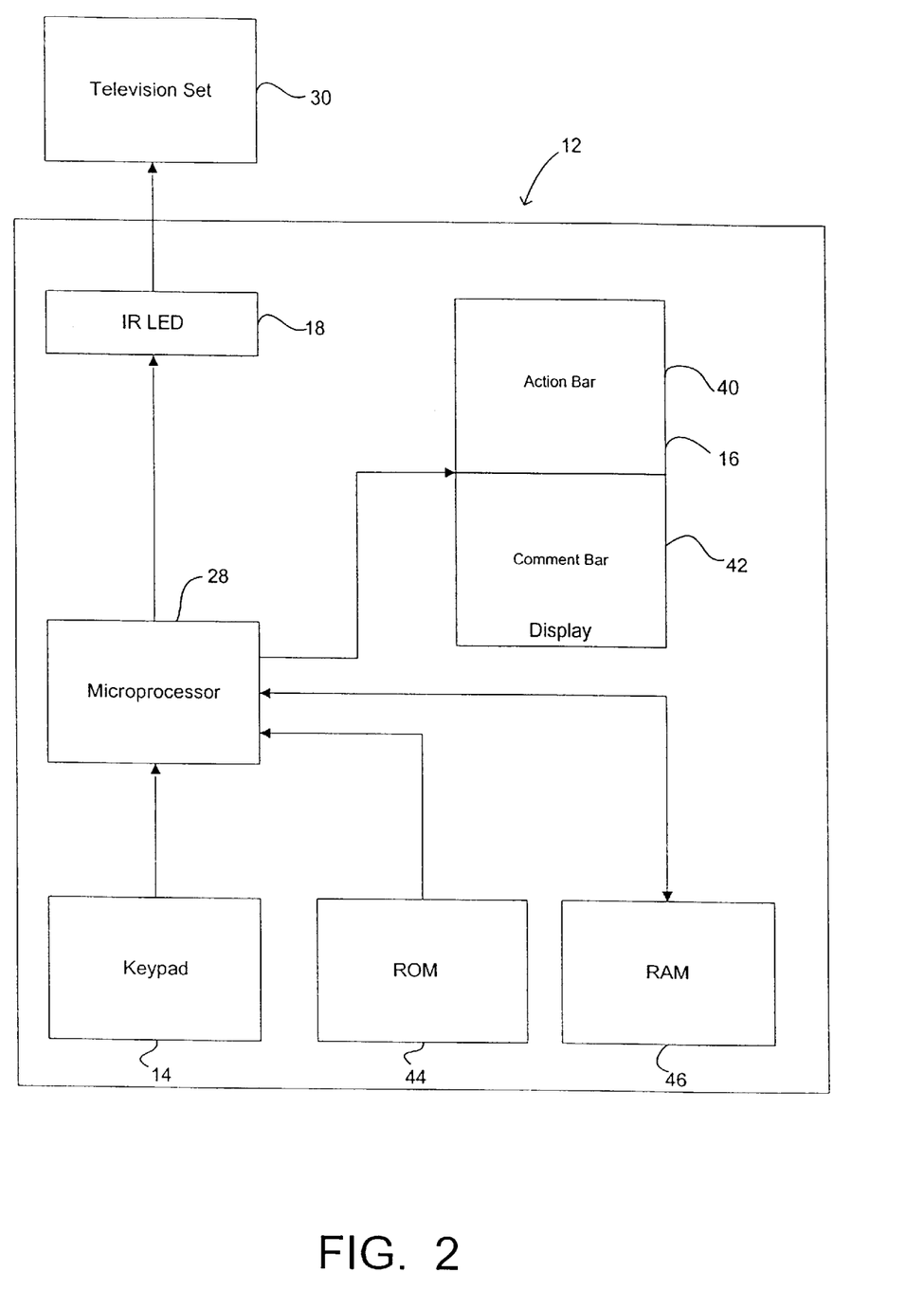
FIG. 2 is a block diagram showing the functional components of the remote control device of FIG. 1.

FIG. 2 is a schematic showing the functional components of the remote control of FIG. 1. FIG. 2 shows that remote control device 12 includes a controller, such as a microcontroller or a microprocessor 28, that receives input from an input device, key pad 14, determines output for an output device, display 16, and controls LED 18 to signal television 20. Display 16 is preferably a two-color LED or liquid crystal display and includes as a first display region an action bar 40 and as a second display region a comment bar 42. Remote control device 12 also includes a read only memory (ROM) 44 that stores a program for carrying out the steps of the invention and a random access read/write memory (RAM) 46 that temporarily stores program results and user input.

Skilled persons can readily select electronic components for implementing the invention. Microprocessor 28 could comprise, for example, a D780308Y microprocessor from NEC Corporation or a MC68HC11D0 microprocessor from Motorola Corporation. RAM 46 could comprise a SDRAM, such as a TC59S6408CFT-10 from Toshiba Corporation or an SRAM, such as a IDT71256L from IDT Corporation. ROM 44 could comprise, for example, a 28F160S3 flash memory from Intel Corporation or an AT28HC256F EEPROM from Atmel Corporation. Skilled persons will understand that the physical components of FIG. 2 do not necessarily correspond one-to-one to the physical circuit components, which are susceptible to many different implementations. For example, the D780308Y microprocessor includes internal memory that can be used in place of an external ROM and RAM.

Figure 3:
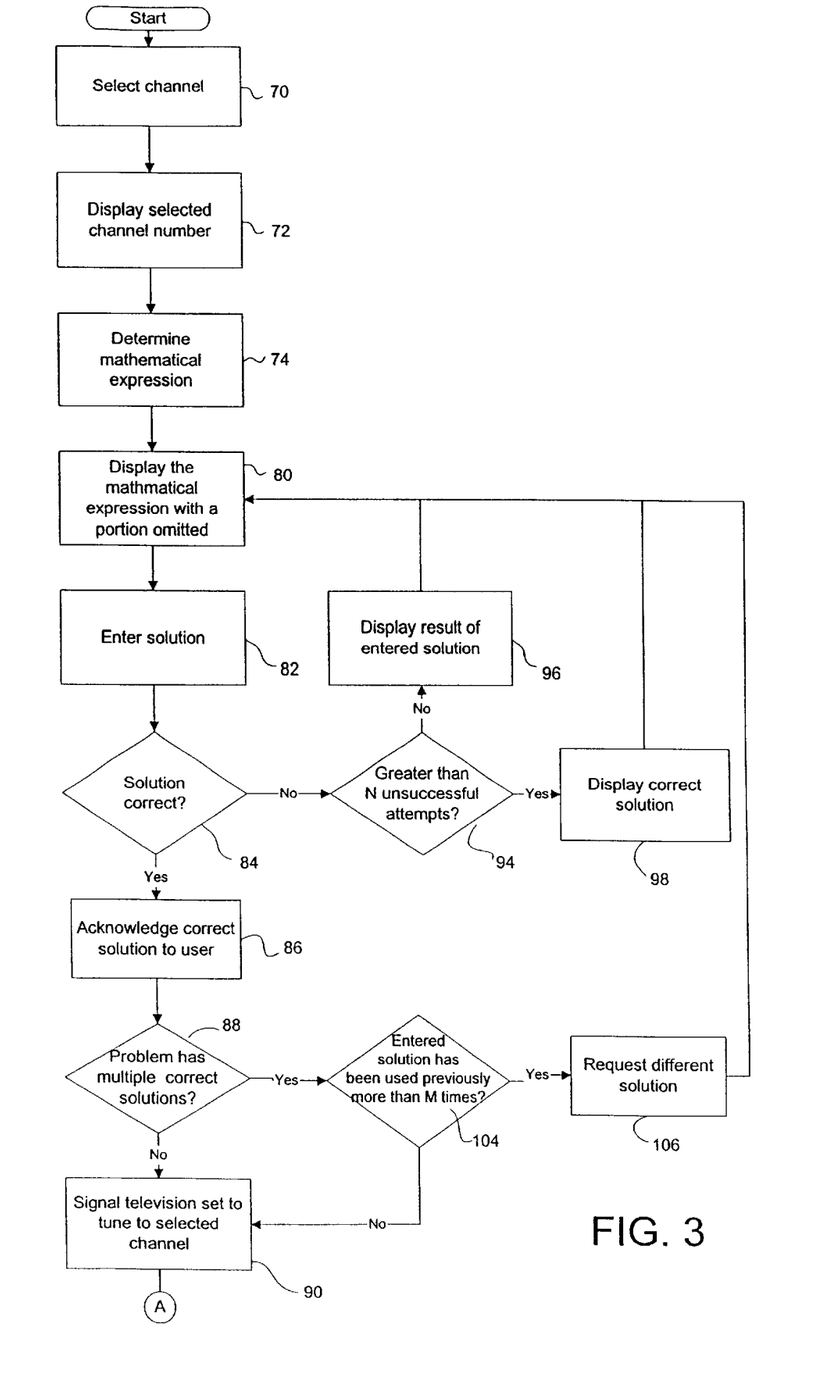
FIG. 3 is a flow chart showing the steps of a preferred embodiment of the present invention relating to mathematics.

FIG. 3 shows a flow chart of a preferred embodiment of the invention for teaching mathematical relationships and skills. In step 70, the user selects the channel he wishes to view by pressing keys of key pad 14. For example, the user could press numeric keys to enter a number or could use "up" or "down" keys to shift relative to the displayed channel. In step 72, microprocessor 28 determines which channel number was selected and displays that number as a target number on the right side of action bar 40. In step 74, microprocessor 28 determines in accordance with the program in ROM 44 a mathematical expression that is equivalent to the target number. For example, the mathematical expression could be determined in accordance with a programmed algorithm, a look-up table, or some other means. In step 80, microprocessor 28 displays on action bar 40 an equals sign to the left of the target number, and, to the left of the equals sign, displays the mathematical expression determined in step 74 with a portion omitted. The user must then correctly supply the omitted portion in the equation in order to be able to view the selected channel.

Figure 4:
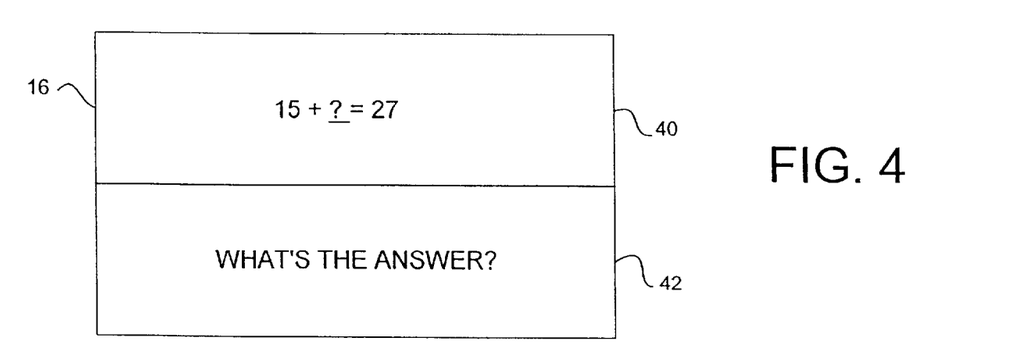
FIG. 4 shows a message displayed on the remote control device of FIG. 1 when a math problem is presented to the student.

For example, FIG. 4 shows that if the user enters "27" as the selected channel in step 70, microprocessor 28 in step 80 may display the following incomplete equation and instruction on action bar 40 and comment bar 42.

15+?=27

WHAT'S THE ANSWER?

Figure 5:
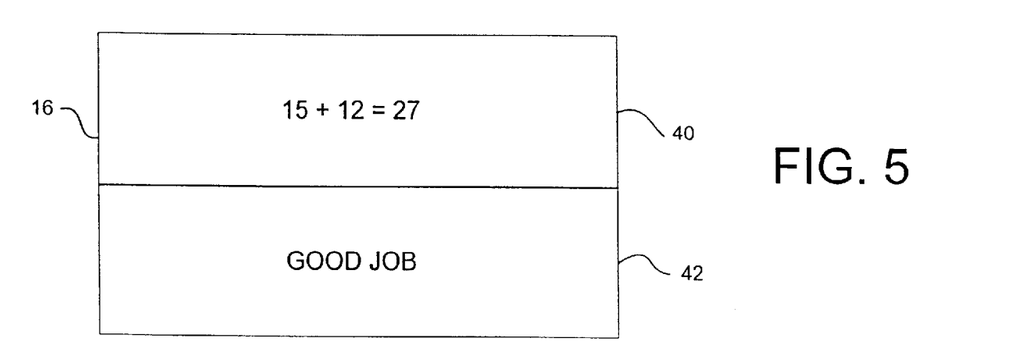
FIG. 5 shows a message displayed on the remote control device of FIG. 1 when the student has correctly solved the presented math problem.

The user enters a solution in step 82. In step 84, microprocessor 28 determines whether solution entered in step 82 is correct. If the solution is correct, microprocessor 28 in step 86 signals display 16, as in FIG. 5, to indicate correctness of response on comment bar 42 with a message such as "CORRECT" or "GOOD JOB." Additional indication may also be given, such as by flashing the correctly completed equation in green characters. Some problems are susceptible to more than a single correct solution. If microprocessor 28 determines in step 88 that the problem does not have multiple correct solutions, microprocessor 28 then instructs LED 18 in step 90 to signal television 20 to tune to channel 27, thereby providing the reward desired by the user.

Figure 6:
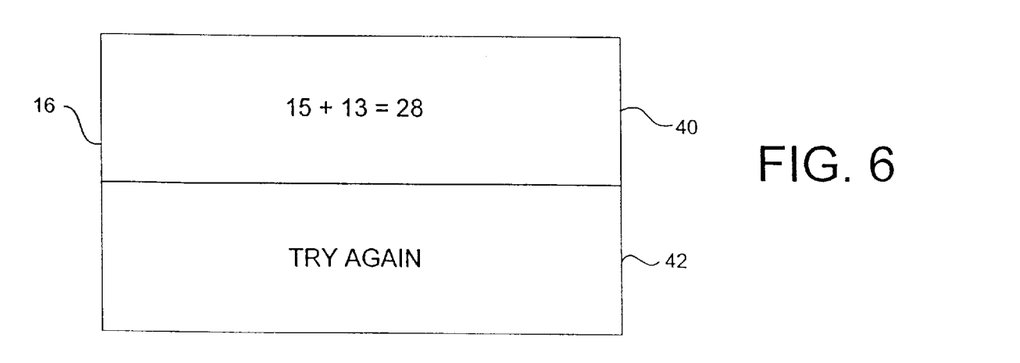
FIG. 6 shows a message displayed on the remote control device of FIG. 1 when the student entered an incorrect solution to the presented math problem.

If the user enters an incorrect solution in step 82, microprocessor 28 determines in step 94 whether the user had made more than a predetermined number of unsuccessful attempts to solve the problem. If not, the display indicates in step 96 that the user's solution is incorrect by displaying the actual result of the user's solution. For example, if the user entered "13" in the example above, FIG. 6 shows that action bar 40 would display "15+13=28", perhaps in flashing red characters, and comment bar 42 would display an encouraging message such as "TRY AGAIN." Microprocessor 28 then repeats step 80, giving the user another opportunity to solve the problem.

Figure 7:
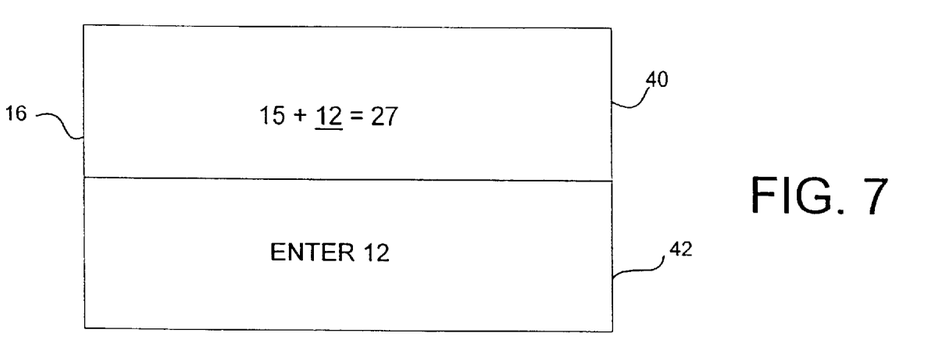
FIG. 7 shows a message displayed on the remote control device of FIG. 1 after the student entered multiple incorrect solutions to the presented math problem.

If the user has made more than a predetermined number, two for example, of unsuccessful attempts to solve the problem, FIG. 7 shows that microprocessor 28 responds in step 98 by displaying the correct solution on action bar 40 and prompting the user on comment bar 42 to enter the given solution. When the user enters the correct number, microprocessor 28 in step 86 instructs display 16 to so indicate, as in FIG. 5, and instructs LED 18 to signal television 20 to tune to the selected channel in step 90. The program in ROM 44 may present the user with an easier problem the next time he selects a channel.

Figure 8:
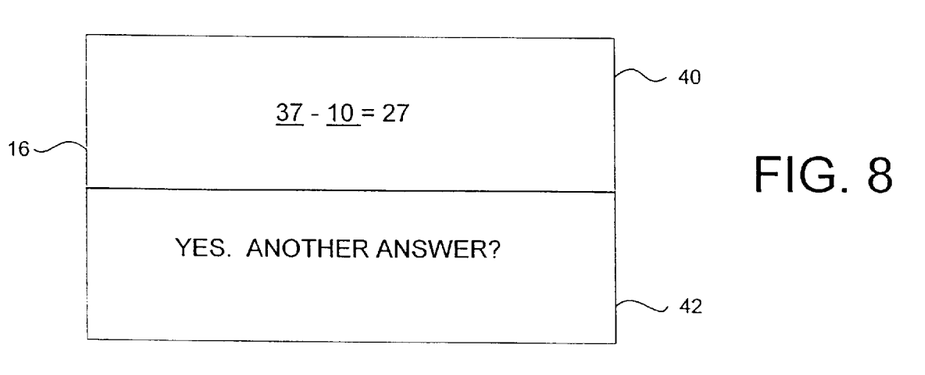
FIG. 8 shows a message displayed on the remote control device of FIG. 1 after the student entered the same correct solution to a math problem multiple times.

If microprocessor 28 determined in step 88 that the presented problem has more than one solution, microprocessor 28 determines in step 104 whether the user has previously entered the particular solution successfully a predetermined number of times. If so, step 106 shows that a different solution is requested. FIG. 8 shows that after a predetermined number of successful repetitions, the program may display the entered solution, e.g., 37-10=27, on action bar 40, but require a different solution, indicated on comment bar 42 by a message such as "YES. ANOTHER ANSWER?" The user must then correctly supply a different solution in order for microprocessor 28 to instruct LED 18 to signal for the selected channel. After a predetermined number of unsuccessful trials, the program will again prompt the user to a correct answer.

Figure 9:
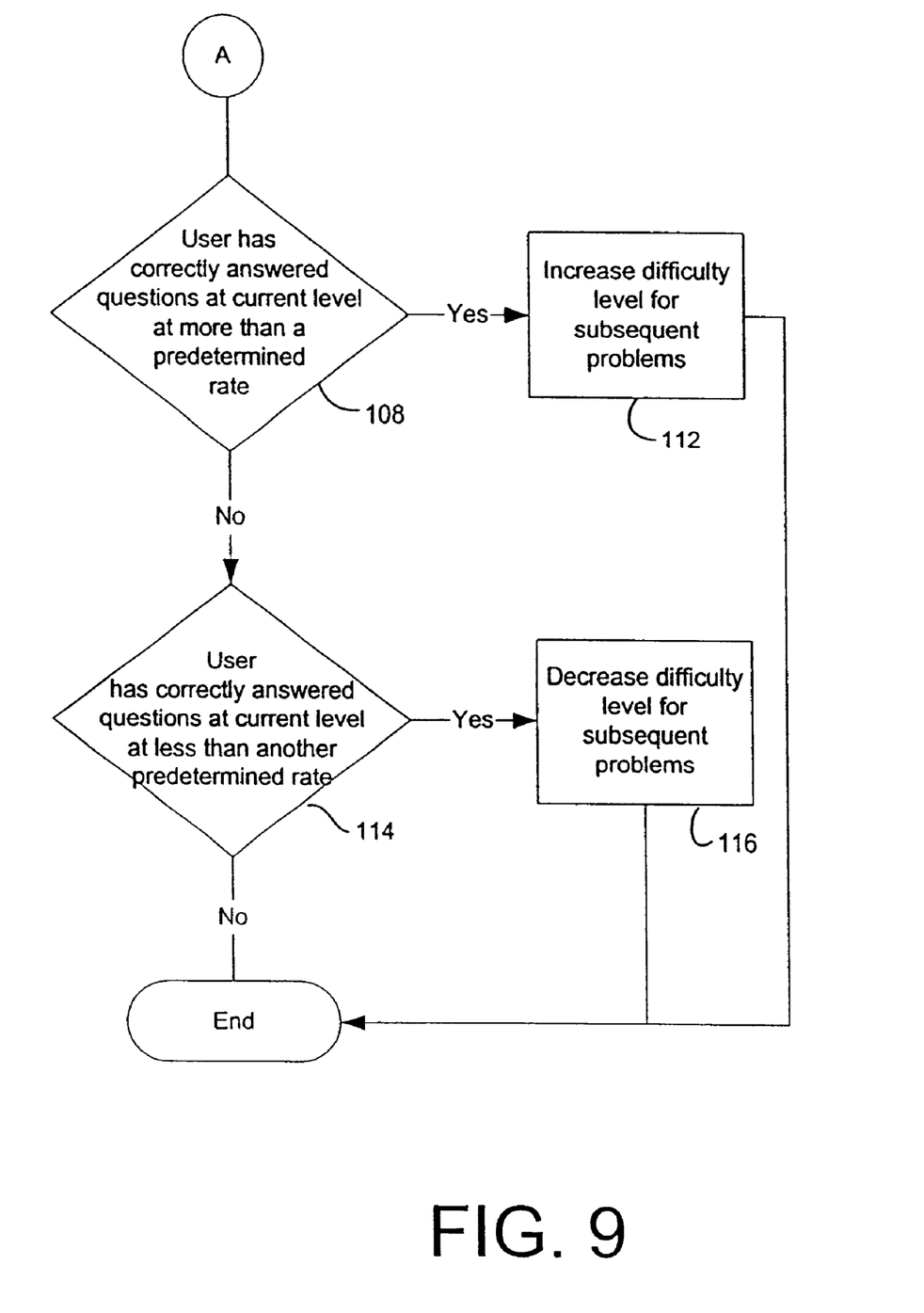
FIG. 9 shows a flow chart showing steps involved in adaptively adjusting the level of difficulty of presented problems.

In a preferred embodiment, the program in ROM 44 may increase the exercise difficulty as the user masters simpler operations. FIG. 9 shows a procedure for varying the difficulty of the presented problems. In step 108, microprocessor 28 determines in accordance with the program if the user has, without prompting, correctly solved the presented problems at least a predetermined number of times at a predetermined rate. If so, the program will increase the level of difficulty for subsequent problems in step 112. For example, the program may systematically add subtraction problems, followed by multiplication, and then division. The program may also systematically add problems that require entry of two numbers, such as

?-?=27.

The program in ROM 44 may, as the user progresses, add even more complex problems, such as

?×(?/?)=27.

If, on the other hand, microprocessor 28 determines in step 114 that the user has failed to solve the presented problems at greater than a predetermined rate, FIG. 9 shows that in step 116 the program in ROM 44 will decrease the level of difficulty for subsequent problems.

In a preferred embodiment, the program in ROM 44 may keep track of the performance of two or more users. Users may then compete against each other for higher scores or against the program, which may assign ranks to users, such as, for example, "novice," "intermediate," or "pro." The program may assign handicaps to users based upon the level of difficulty achieved, facilitating competition between users of different ages and educational backgrounds.

Although the invention has been illustrated with simple arithmetical operations, the channel selection device may use more complex mathematical expressions, and the complexity of the problems presented may continue to increase as the user becomes more proficient. The term "mathematical problem" is used broadly and may also include, for example, converting or changing forms of numerical expressions, such as from words to numerals. Further, to prevent the user from bypassing the problem, a television set including multiple channel selections means, such as a control panel on the set and a remote control, can be programmed so that the set will not function other than through the channel selection device embodying the invention.

The described embodiments of the invention are only considered to be preferred and illustrative of the inventive concept, and the scope of the invention is not to be restricted to such embodiments. In the embodiment described above, the controller, input device and output device are incorporated into a remote control device. In other embodiments, these components may be integrated into the television set itself, into a box on the set-top or elsewhere, or be distributed among such system components in any manner. The invention is not limited to any particular input or output devices. Various and numerous other arrangements may be devised by one skilled in the art without departing from the spirit and scope of this invention.

Although the present invention and its advantages have been described in detail, it should be understood that various changes, substitutions and alterations can be made to the embodiments described herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

I claim as follows:

1. An electronic teaching system incorporated into a television channel selection system to motivate learning mathematics by requiring a user to solve a mathematical problem before a television set will tune to the selected channel, the system comprising:

a non-volatile memory storing an educational program;

an output device for presenting information to a user;

an input device for a user to enter information including a selected television channel;

a controller programmed to execute the educational program stored in the non-volatile memory to receive from the input device a number corresponding to the selected television channel, presenting through the output device a mathematical problem involving the number corresponding to the selected television channel, and receiving a solution to the mathematical problem entered through the input device by the user determine whether the entered solution is correct, and if so, causing the television set to tune to the selected television channel.

2. The system of claim 1 in which the non-volatile memory, the input device, and the controller are located on a remote control device apart from the television set.

3. The system of claim 2 in which the output device is located on the remote control device apart from the television set.

4. The system of claim 3 in which the output device comprises one of a light emitting diode device, a liquid crystal device, or a plasma display device.

5. The system of claim 1 in which the output device comprises a screen associated with television set.

6. The system of claim 1 in which presenting a problem includes presenting an arithmetic expression that equates to the selected channel number, the arithmetic expression having one or more portions omitted.

7. The system of claim 1 in which presenting a problem includes presenting a problem requiring more than one entry in the solution.

8. The system of claim 1 in which the controller executes a program that presents the problem to the user again if the controller determined that the entered solution is incorrect.

9. The system of claim 1 in which the controller executes a program that presents the problem to the user again if the controller determined that the entered solution is identical to a previously entered solution.

10. The system of claim 1 in which the controller executes a program that presents a more difficult problem to the user after the user achieves a predetermined rate of success.

11. The system of claim 1 in which the controller executes a program that presents problems characterized by levels of difficulty and, if the user drops below a predetermined rate of success, the program further includes:

requesting the user to enter another number corresponding to a television channel; and presenting another problem involving the another number and having a level of difficulty less than that of the previous problem.

12. A method of motivating people to learn by providing a reward of a person's own choosing and integrating the reward into a learning exercise, the method comprising:

entering a number corresponding to a television channel;

presenting a mathematical problem involving the channel number;

entering a solution to the mathematical problem;

determining whether the solution is correct; and if the solution is correct, causing a television set to tune to the television channel.

13. The method of claim 12 wherein presenting a mathematical problem includes presenting an incomplete mathematical expression that can be completed to equate to the entered television channel.

14. The method of claim 12 further comprising presenting the mathematical problem again if the entered solution is incorrect.

15. The method of claim 12 wherein the mathematical problem is characterized by a level of difficulty and further comprising, if the user achieves a predetermined rate of success:

entering another number corresponding to a television channel; and presenting another mathematical problem involving the other number and having a level of difficulty greater than that of the first mathematical problem.

16. The method of claim 12 wherein the mathematical problem is characterized by a level of difficulty and further comprising, if the user drops below a predetermined rate of success:

entering another number corresponding to a television channel; and presenting another mathematical problem involving the other number and having a level of difficulty less than that of the first mathematical problem.

17. The method of claim 12 wherein the mathematical problem requires one entry as a solution.

18. The method of claim 12 wherein the mathematical problem requires multiple entries as a solution.

19. The method of claim 12 wherein the mathematical problem is susceptible to multiple correct solutions and further comprising entering another number corresponding to a television channel, the other number being the same as the previously entered number;

presenting again the mathematical problem involving the channel number;

entering a solution to the mathematical problem;

determining whether the entered solution is identical to a previously entered solution; and if the solution is identical, presenting a request for a different solution.

20. A reward-based game comprising:

(a) presenting a mathematical problem involving a television channel number;

(b) entering a solution to the mathematical problem;

(c) causing a television set to tune to the television channel if the solution is correct;

(d) repeating steps (a) through (c) multiple times;

(e) tracking the number of successful solutions entered; and (f) acknowledging a cumulative number of correct solutions.

21. The method of claim 20 in which:

multiple users perform steps (a) through (d);

tracking the number of successful solutions entered includes tracking the number of successful solutions entered by the multiple users; and acknowledging a cumulative number of correct solutions includes indicating which user has the most successful solutions.

22. The method of claim 20 in which acknowledging a cumulative number of correct solutions includes indicating a level of achievement.

* * * * *